(12) United States Patent
Choi

(10) Patent No.: US 11,422,641 B2
(45) Date of Patent: Aug. 23, 2022

(54) TOUCH SENSING DEVICE AND TOUCH SENSING SYSTEM

(71) Applicant: SILICON WORKS CO., LTD., Daejeon (KR)

(72) Inventor: Ho Sup Choi, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/176,814

(22) Filed: Feb. 16, 2021

(65) Prior Publication Data

US 2021/0263601 A1    Aug. 26, 2021

(30) Foreign Application Priority Data

Feb. 21, 2020 (KR) .................. 10-2020-0021327

(51) Int. Cl.
| | |
|---|---|
| *G06F 3/0354* | (2013.01) |
| *G06F 3/038* | (2013.01) |
| *G06F 3/044* | (2006.01) |
| *G06F 3/041* | (2006.01) |

(52) U.S. Cl.
CPC ........ *G06F 3/03545* (2013.01); *G06F 3/0383* (2013.01); *G06F 3/0412* (2013.01); *G06F 3/0442* (2019.05); *G06F 3/0446* (2019.05); *G06F 2203/0382* (2013.01); *G06F 2203/04106* (2013.01)

(58) Field of Classification Search
CPC .. G06F 3/03545; G06F 3/0442; G06F 3/0446; G06F 3/0383; G06F 3/0412; G06F 2203/0382; G06F 2203/04106
See application file for complete search history.

(56) References Cited

U.S. PATENT DOCUMENTS

| | | | |
|---|---|---|---|
| 2018/0113559 A1* | 4/2018 | Bae ........................ | G06F 3/0383 |
| 2018/0129311 A1* | 5/2018 | Westhues ............ | G06F 3/04162 |
| 2020/0201505 A1* | 6/2020 | Jung .................... | G06F 3/04162 |

FOREIGN PATENT DOCUMENTS

| | | |
|---|---|---|
| JP | 6749397 B2 | 9/2020 |
| KR | 10-2018-0046338 A | 5/2018 |
| KR | 10-2084637 B1 | 3/2020 |

\* cited by examiner

*Primary Examiner* — Peter D Mcloone
(74) *Attorney, Agent, or Firm* — Fenwick & West LLP

(57) ABSTRACT

A touch sensing device can reduce the searching time and the report rate for an active pen through a local search for the active pen.

14 Claims, 13 Drawing Sheets

TOUCH SENSING DEVICE AND TOUCH SENSING SYSTEM

CROSS-REFERENCE TO RELATED APPLICATION

This application claims priority from Republic of Korea Patent Application No. 10-2020-0021327, filed on Feb. 21, 2020, which is hereby incorporated by reference in its entirety.

BACKGROUND

1. Technical Field

The present embodiment relates to a technology and display apparatus for sensing a touch or approach of an active pen.

2. Related Art

A technology for recognizing an external object that approaches or touches a touch panel is referred to as a touch sensing technology. The touch panel is placed at the same location as a display panel on a plane. Accordingly, a user may input a user manipulation signal to the touch panel while viewing an image of the display panel. Such a method of generating a user operation signal is remarkably intuitive for users compared with previous other user operation signal input types, such as a mouse input method or a keyboard input method.

According to such an advantage, the touch sensing technology is applied to various electronic devices including display panels. A touch sensing device may supply a driving signal to a driving electrode disposed in a touch panel, may receive a response signal formed in a sensing electrode, and may sense a touch or approach of an external object for the touch panel. The touch panel generates capacitance between the driving electrode and the sensing electrode. A change in the capacitance may generate the touch or approach of the external object.

A user may use an active pen in addition to a finger in order to input a user manipulation signal. Data communication between the active pen and a touch sensing device may experience the following process. When the touch sensing device transmits an uplink signal which may be recognized by the active pen, the active pen may receive the uplink signal and recognize the touch sensing device. Thereafter, when the active pen transmits a downlink signal which may be recognized by the touch sensing device, the touch sensing device may receive the downlink signal and recognize the active pen.

Up to the step of transmitting, by the touch sensing device, the uplink signal may be defined as a search for the active pen. In contrast, a step from the step of transmitting the uplink signal to the step of recognizing, by the touch sensing device and the active pen, each other and transmitting and receiving the downlink signal may be defined as the sensing of the active pen. As described above, the search for the active pen and the sensing of the active pen may be distinguished from each other. The greatest difference lies in that the search may be an operation of finding, by the touch sensing device, the presence of the active pen in the state in which the touch sensing device is unaware of the presence of the active pen and the sensing may be an operation of exchanging, by the touch sensing device, data with the active pen in the state in which the touch sensing device is aware of the presence of the active pen.

However, conventionally, the touch sensing device sequentially performs the operations of searching for and sensing the active pen. That is, although the active pen is placed at the bottom of the touch panel, the touch sensing device searches for or senses the active pen from the top of the touch panel. Since the touch sensing device performs a search for or sensing even a touch panel area where the active pen is not present, such a method may cause an unnecessary process and cause a problem in that a searching time or a sensing time is increased. In this case, the report rate of the sensing of the active pen is increased. If the active pen is released, that is, although the active pen is separated from the touch panel, sensing is stopped, and the active pen is searched for again, such a phenomenon may be repeated.

SUMMARY

The present embodiment is intended to provide a technology in which a touch sensing device capable of reducing a searching time and a report rate operates a plurality of active pens.

An object of the present disclosure is to provide a technology for searching for an active pen at a location where the active pen is released or in the vicinity thereof.

Another object of the present disclosure is to provide a technology for searching for a plurality of active pens together at locations where the plurality of active pens is released or in the vicinity thereof.

Still another object of the present disclosure is to provide a technology for a method of assigning, to a plurality of active pens, a plurality of touch intervals included in one frame.

To this end, in an aspect, the present disclosure provides a touch sensing device for sensing a touch or approach of an active pen, comprising: a driving circuit configured to transmit an uplink signal; and a sensing circuit configured to receive a downlink signal corresponding to the uplink signal, wherein, when the reception of the first downlink signal from a first active pen through the first touch electrode is stopped, the sensing circuit starts to search for the first active pen through the first touch electrode or touch electrodes near the first touch electrode.

In the device, when the reception of the first downlink signal through the first touch electrode is stopped, the driving circuit may transmit a first uplink signal in order to search for the first active pen through the first touch electrode or the touch electrodes near the first touch electrode.

In the device, the sensing circuit may restart to receive the first downlink signal through the first touch electrode or the touch electrodes near the first touch electrode and may resume sensing a touch or approach of the first active pen.

In the device, the sensing circuit may receive a synchronization signal which defines display intervals and touch intervals and may receive the first downlink signal in order to sense the first active pen in some of the touch intervals.

In the device, the driving circuit may transmit a second uplink signal to a second active pen. The sensing circuit may receive a second downlink signal, corresponding to the second uplink signal, from the second active pen through a second touch electrode, and may start to search for the second active pen by waiting for the reception of the second downlink signal through the second touch electrode or touch electrodes near the second touch electrode when the reception of the second downlink signal through the second touch electrode is stopped.

In the device, the sensing circuit may sense both the first active pen and the second active pen in every frame.

In the device, the sensing circuit may receive a synchronization signal which defines display intervals and touch intervals and may sense the first active pen in some of the touch intervals of one frame and senses the second active pen in the others of the touch intervals thereof.

In the device, the driving circuit may transmit a touch driving signal to the touch electrodes and the sensing circuit may sense a touch or approach of an object for a panel in response to a response signal of the touch electrodes for the touch driving signal.

In the device, the sensing circuit may start to search for the first active pen if the first downlink signal is not received for a predetermined time.

In another aspect, the present disclosure provides a touch sensing system for sensing a plurality of active pens, comprising: a panel including a first touch and a second touch area; and a touch sensing device configured to sense the touch or approach of the first active pen in the first touch area and to sense the touch or approach of the second active pen in the second touch area, wherein, when the sensing of the first active pen in the first touch area is stopped, the touch sensing device performs a search to check the presence of the first active pen in the first touch area or in the vicinity of the first touch area.

In the system, when the sensing of the second active pen in the second touch area is stopped, the touch sensing device may perform both the search for the first active pen in the first touch area and the search for the second active pen in the second touch area.

In the system, the touch sensing device may receive a synchronization signal which defines display intervals and touch intervals, may search for the first active pen in some of the touch intervals of one frame, and may search for the second active pen for in the others of the touch intervals thereof.

In the system, when the sensing of the first active pen and the second active pen is resumed, the touch sensing device may sense the first active pen in the some of the touch intervals, and may sense the second active pen in the others of the touch intervals.

In the system, the touch sensing device may identify the location of the first active pen through the search.

As described above, according to the present disclosure, a searching time and report rate for an active pen can be reduced through a local search for the active pen.

In addition, according to the present disclosure, a plurality of active pens can be simultaneously operated.

DETAILED DESCRIPTION

Figure 1:
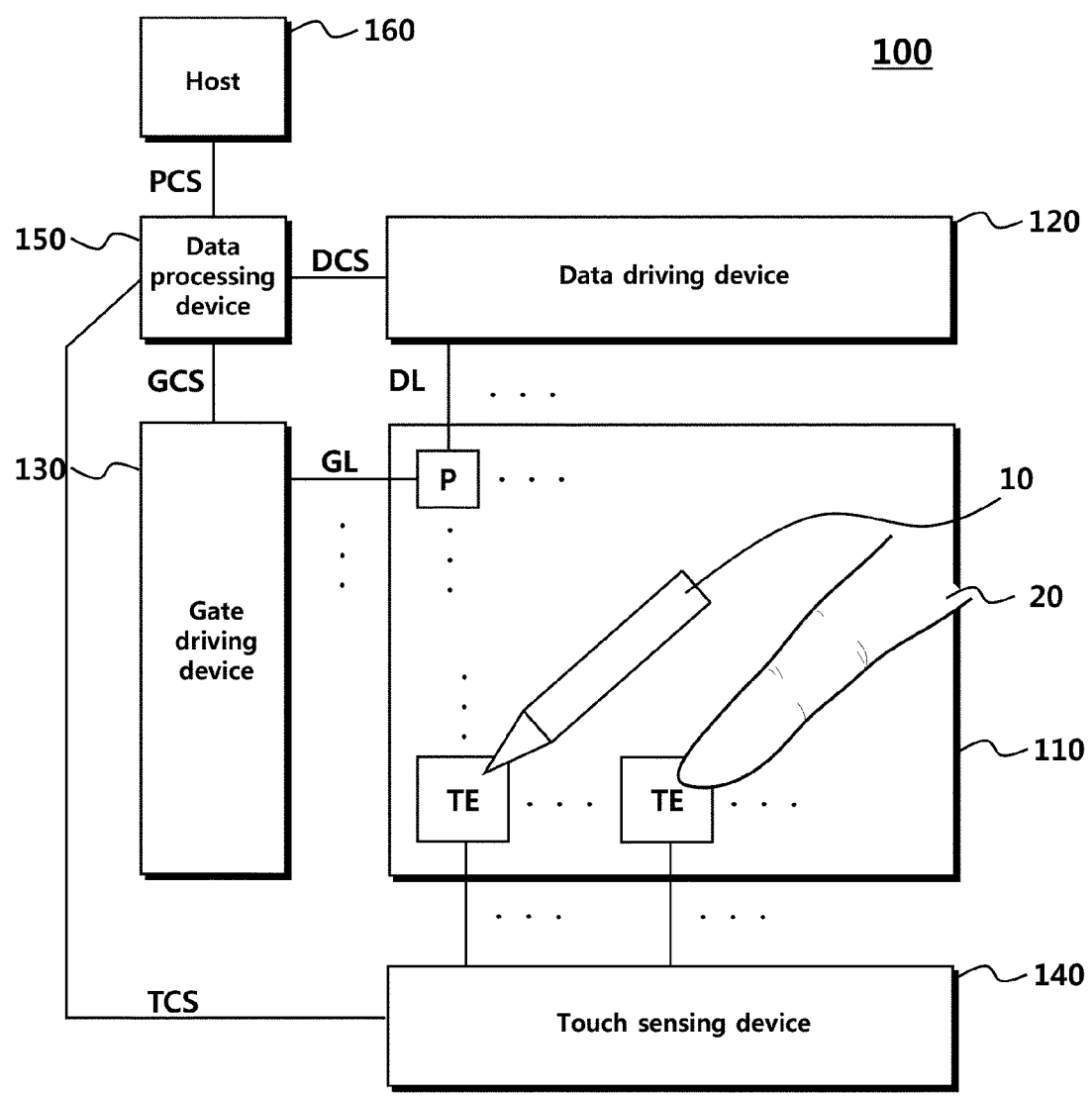
FIG. 1 is a diagram illustrating a configuration of a display apparatus according to an embodiment.

FIG. 1 is a diagram illustrating a configuration of a display apparatus 100 according to an embodiment.

Referring to FIG. 1, the display apparatus 100 may include a panel 110, a data driving device 120, a gate driving device 130, a touch sensing device 140, a data processing device 150, a host 160, etc.

At least one driving device of the data driving device 120, the gate driving device 130, the touch sensing device 140, and the data processing device 150 may be called a display driving device. For example, the data driving device 120 may be called a display driving device. A driving device including the data driving device 120 and the touch sensing device 140 may be called a display driving device. One driving device may be included in another driving device. For example, the data driving device 120 may be included in the touch sensing device 140. Alternatively, the gate driving device 130 may be included in the data driving device 120. In an embodiment, only some elements of one driving device may be included in another driving device.

The data driving device 120 may drive a data line DL connected to a pixel P. The gate driving device 130 may drive a gate line GL connected to the pixel P. Furthermore, the touch sensing device 140 may drive a touch electrode TE disposed in the panel 110.

The data driving device 120 may supply a data voltage to the data line DL in order to display an image in each pixel P of the panel 110. The data driving device 120 may include at least one data driver integrated circuit (IC). The at least one data driver IC may be connected to a bonding pad of the panel 110 through a tape automated bonding (TAB) method or a chip on glass (COG) method, or may be directly formed on the panel 110. In some cases, the at least one data driver IC may be integrated and formed on the panel 110. Furthermore, the data driving device 120 may be implemented through a chip on film (COF) method.

The data driving device 120 may receive image data and a data control signal DCS from the data processing device 150. The data driving device 120 may generate a data voltage based on a grayscale value of each pixel indicated by the image data, and may drive the corresponding pixel.

The data control signal DCS may include at least one synchronization signal. For example, the data control signal DCS may include a vertical synchronization signal VSYNC, a horizontal synchronization signal HSYNC, a time division signal, etc. The data driving device 120 may identify the division of frames indicated by the vertical synchronization signal VSYNC, and may drive each pixel in an interval other than a vertical blank interval indicated by the vertical synchronization signal VSYNC. The data driving device 120 may check image data for each horizontal line in response to the horizontal synchronization signal HSYNC, and may supply a data voltage for each horizontal line. The data driving device 120 may distinguish between a display interval and a touch interval in response to the time division signal, and may drive each pixel P in the display interval.

The gate driving device 130 may supply a scan signal to the gate line GL in order to turn on or off a transistor located in each pixel P. Depending on a driving method, the gate driving device 130 may be located only on one side of the panel 110 as illustrated in FIG. 1 or the gate driving device 130 may be divided into two driving devices, which may be located on either side of the panel 110. Furthermore, the gate driving device 130 may include at least one gate driver IC. The at least one gate driver IC may be connected to a bonding pad of the panel 110 through the TAB method or the COG method or may be implemented as a gate in panel (GIP) and directly formed on the panel 110. In some cases, the at least one gate driver IC may be integrated and formed on the panel 110. Furthermore, the gate driving device 130 may be implemented through the COF method.

The gate driving device 130 may receive a gate control signal GCS from the data processing device 150. The gate control signal GCS may include a plurality of clock signals. Furthermore, the gate driving device 130 may generate a scan signal using the clock signal and supply the scan signal to the gate line GL.

The panel 110 may include a display panel, and may further include a touch screen panel (TSP). In this case, the display panel and the TSP may share some elements. For example, the touch electrode TE for sensing a touch in the TSP may be used as a common electrode to which a common voltage is supplied in the display panel (e.g., if the display panel is a liquid crystal display (LCD) panel). For another example, the touch electrode TE may be used as a cathode electrode to which a base voltage VSS is supplied in the display panel (e.g., if the display panel is an organic light emitting diode (OLED) panel). From the point of view in which some elements of the display panel and the TSP are shared, such a panel 110 is called an integrated panel, but the present disclosure is not limited thereto. Furthermore, an in-cell type panel is known as a form in which the display panel and the TSP are integrated, but is merely an example of the panel 110. A panel to which the present disclosure is applied is not limited to such an in-cell type panel.

A plurality of touch electrodes TE may be disposed in the panel 110. The touch sensing device 140 may drive a touch electrode TE using a touch driving signal. Furthermore, the touch sensing device 140 may generate a sensing value for the touch electrode TE in response to a response signal formed in the touch electrode TE in accordance with the touch driving signal. Furthermore, the touch sensing device 140 may calculate touch coordinates of an object 20 using a sensing value for the plurality of touch electrodes TE disposed in the panel 110. The calculated touch coordinates may be transmitted to and used by another device (e.g., the host).

The touch sensing device 140 may exchange signals with an active pen 10 through a touch electrode TE. The touch sensing device 140 may supply an uplink signal to the touch electrode TE. The active pen 10 may receive the uplink signal through a contact with the touch electrode TE. The uplink signal may include information such as panel information and information on the version of a protocol, or a synchronization signal, for example. The active pen 10 may check information on the panel or the version of a protocol by receiving the uplink signal, and may synchronize signals.

The active pen 10 may transmit a downlink signal to a touch electrode TE. Furthermore, the touch sensing device 140 may receive the downlink signal through the touch electrode TE. The downlink signal may include information on the state of the active pen. The information on the state of the active pen may include the location of the active pen, the button state of the active pen, the battery state of the active pen, the tilt of the active pen, for example.

The touch sensing device 140 may receive a touch control signal TCS from the data processing device 150. The touch control signal TCS may include at least one synchronization signal. For example, the touch control signal TCS may include a vertical synchronization signal VSYNC, a time division signal, a touch synchronization signal TSYNC, etc. The touch sensing device 140 may distinguish between a display interval and a touch interval in response to the time division signal or the touch synchronization signal TSYNC, and may drive a touch electrode TE within the touch interval.

In an embodiment, synchronization signals may be the same signal or may be different signals. For example, the time division signal may be the same signal as the touch synchronization signal and may be different signals. Hereinafter, in order to emphasize a specific function, the time division signal may be described by using a specific name, but such a description is not limited to a specific name.

The synchronization signals may be basically generated based on a panel control signal PCS supplied from the host 160 to the data processing device 150.

The host 160 may transmit image data to the data processing device 150, and may transmit a vertical synchronization signal VSYNC for dividing the image data in a frame unit. The data processing device 150 may generate a time division signal, a touch synchronization signal TSYNC, etc. based on the vertical synchronization signal VSYNC, and may transmit the time division signal, the touch synchronization signal TSYNC, etc. to each of the driving devices 120, 130, and 140.

Figure 2:
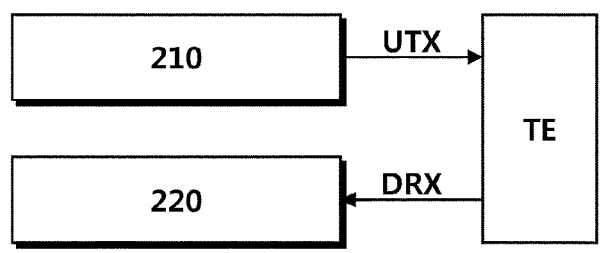
FIG. 2 is a diagram illustrating a configuration of a touch sensing device according to an embodiment.

FIG. 2 is a diagram illustrating a configuration of the touch sensing device according to an embodiment.

Referring to FIG. 2, the touch sensing device 140 may include a driving circuit 210 and a sensing circuit 220.

The driving circuit 210 may supply an uplink transmission signal UTX to a touch electrode TE in a first time interval. In this case, the uplink transmission signal UTX is an uplink signal formed in the touch electrode TE. An uplink signal formed in the active pen may be called an uplink reception signal.

The sensing circuit 220 may receive a downlink reception signal DRX from the touch electrode TE in a second time interval not overlapping the first time interval. In this case, the downlink reception signal DRX is a downlink signal formed in the touch electrode TE. A downlink signal formed in the active pen may be called a downlink transmission signal.

In the step of searching for the active pen, the driving circuit 210 may consistently transmit an uplink signal to the active pen through a touch electrode. The sensing circuit 220 may wait for the reception of a downlink signal through the touch electrode.

The touch electrode TE may be a common electrode to which a common voltage is supplied in a liquid crystal display(LCD) panel. Alternatively, the touch electrode TE may be a cathode electrode of an OLED panel.

Figure 3:
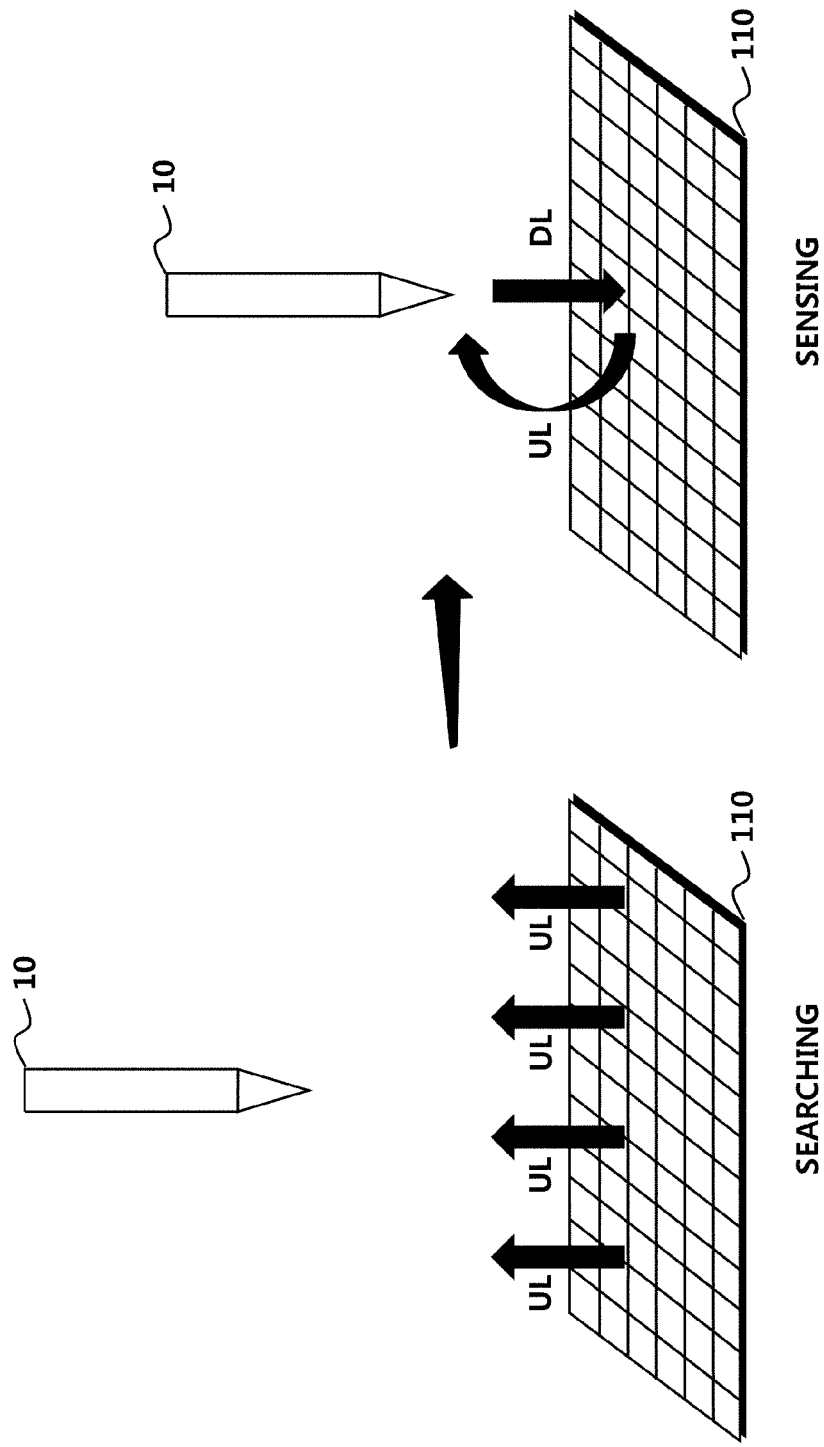
FIG. 3 is a diagram for describing that one active pen and panel exchange link signals according to an embodiment.

FIG. 3 is a diagram for describing that one active pen and the panel exchange link signals according to one embodiment.

Referring to FIG. 3, a process of transmitting and receiving link signals between one active pen 10 and the panel 110 is illustrated. The process of transmitting and receiving link signals may be divided into a searching step SEARCHING and a sensing step SENSING. In the searching step, the touch sensing device 140 may transmit an uplink signal UL in order to recognize the presence of the active pen through the panel 110. In the sensing step, after recognizing the presence of the active pen, the touch sensing device 140 may receive a downlink signal DL in order to receive data of the active pen.

In the searching step, the driving circuit 210 of the touch sensing device 140 may transmit the uplink signal UL to the active pen 10 through a touch electrode. When the active pen 10 touches the panel 110 including the touch electrode TE or approaches the panel 110 including the touch electrode TE within a predetermined distance, the active pen 10 may receive the uplink signal UL. The uplink signal UL may be transmitted to the active pen 10 over some of the panel 10 or the entire panel 110.

In the sensing step, the sensing circuit 220 of the touch sensing device 140 may receive the downlink signal DL from the active pen 10 through the touch electrode TE. When the active pen 10 receives the uplink signal UL, the active pen 10 may transmit the downlink signal DL. The downlink signal DL may be transmitted to a touch electrode TE located at a point touched or approached by the active pen 10.

When the downlink signal DL is received by the touch sensing device 140, the touch sensing device 140 may consistently exchange data with the active pen 10. If the downlink signal DL is not received by the touch sensing device 140 from any timing, the touch sensing device 140 may search for the active pen 10 again. That is, the touch sensing device 140 may repeat the above process by transmitting an uplink signal UL to the active pen 10 again. In this case, if the downlink signal DL is not received by the touch sensing device 140 from any timing, this may be understood that the active pen 10 has been released.

Figure 4:
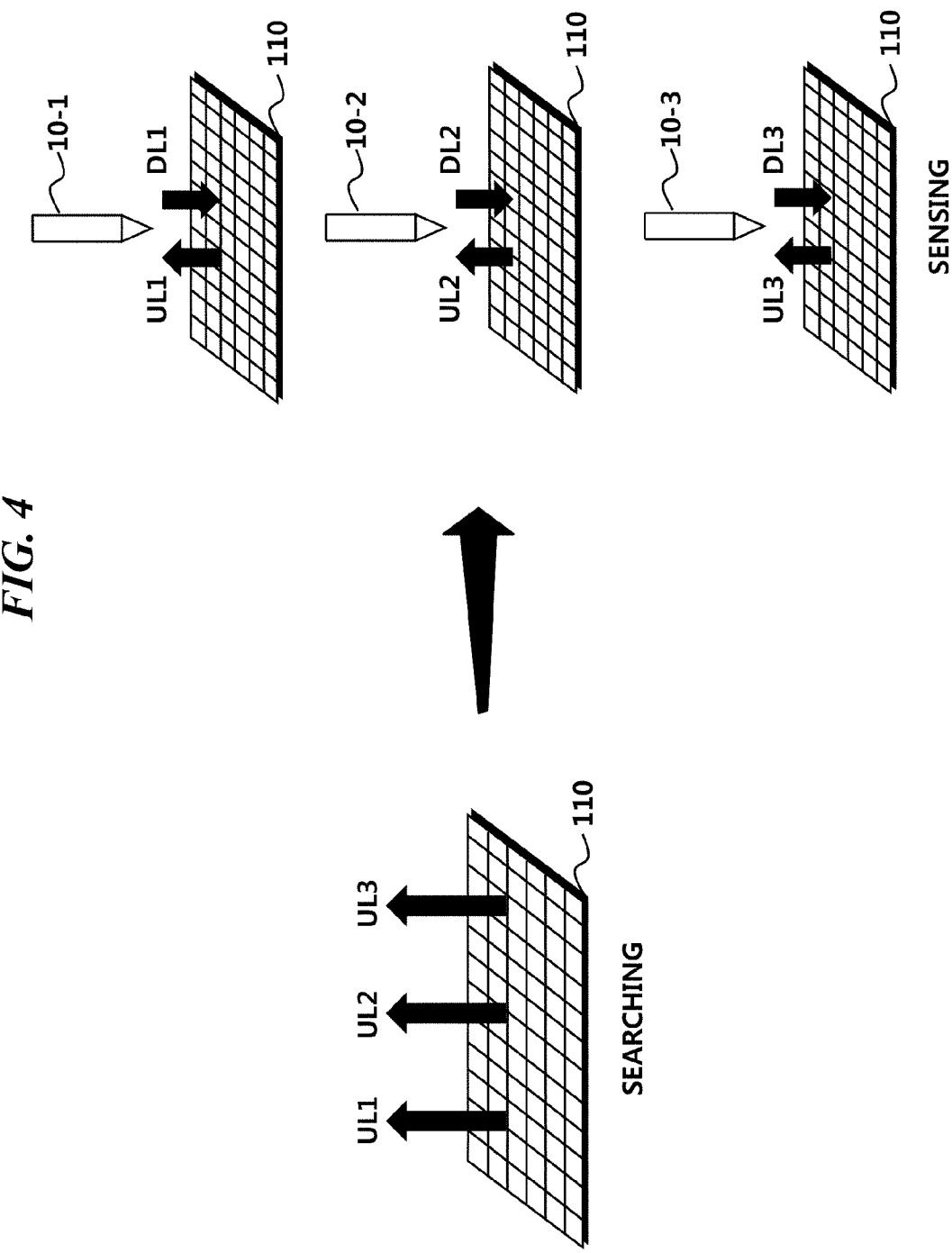
FIG. 4 is a diagram for describing that a plurality of active pens and the panel exchange link signals according to an embodiment.

FIG. 4 is a diagram for describing that a plurality of active pens 10-1 to 10-3 and the panel exchange link signals according to an embodiment.

Referring to FIG. 4, a process of transmitting and receiving link signals between the plurality of active pens and the panel 110 according to an embodiment is illustrated. Hereinafter, an example in which three active pens 10-1, 10-2, and 10-3 touch or approach the panel 110 is illustrated, but the present disclosure is not limited thereto. In a searching step, the touch sensing device 140 may recognize the presence of the three active pens 10-1, 10-2, and 10-3. In a sensing step, the touch sensing device 140 may receive downlink signals from the three active pens 10-1, 10-2, and 10-3.

In the searching step, the driving circuit 210 of the touch sensing device 140 may transmit uplink signals to the plurality of active pens. The driving circuit 210 may independently transmit the uplink signals for the plurality of active pens at different timings. For example, the driving circuit 210 may transmit a first uplink signal UL1 to the first active pen 10-1 at a first time interval, may transmit a second uplink signal UL2 to the second active pen 10-2 at a second time interval, and may transmit a third uplink signal UL3 to the third active pen 10-3 at a third time interval. In this case, the driving circuit 210 may transmit the first to third uplink signals UL1 to UL3 at different timings so that the first to third uplink signals UL1 to UL3 do not overlap.

Furthermore, the sensing circuit 220 of the touch sensing device 140 may search for the plurality of active pens by waiting for the reception of a downlink signal, corresponding to an uplink signal, through a touch electrode TE. After first receiving one downlink signal while searching for the plurality of active pens, the sensing circuit 220 may consistently receive a next downlink signal from one active pen that has transmitted the one downlink signal. Alternatively, after receiving another downlink signal from another active pen, the sensing circuit 220 may consistently receive another next downlink signal from the other active pen. In this case, the sensing circuit 220 may alternately receive the downlink signals from the one active pen and the other active pen.

In the sensing step, the sensing circuit 220 may independently execute searches for the plurality of active pens at different timings. For example, the sensing circuit 220 may wait for the reception of the first downlink signal DL1 from the first active pen 10-1 at the first time interval, may wait for the reception of the second downlink signal DL2 from the second active pen 10-2 at the second time interval, and may wait for the reception of the third downlink signal DL3 from the third active pen 10-3 at the third time interval. In this case, the sensing circuit 220 may receive the first to third downlink signals DL1 to DL3 at different timings so that the first to third downlink signals DL1 to DL3 do not overlap. For example, the sensing circuit 220 may receive the first to third downlink signals DL1 to DL3 at different touch intervals so that the first to third downlink signals DL1 to DL3 do not overlap.

In order to search for the plurality of active pens at different timings, the sensing circuit 220 may search for each of the plurality of active pens in every frame or may search for all of the plurality of active pen in every frame. The sensing circuit 220 may use any one of a first method of intensively searching for only one active pen in one frame and a second method of searching for all of the plurality of active pens in one frame.

When a downlink signal from one of the plurality of active pens is received by the touch sensing device 140, the touch sensing device 140 may consistently exchange data with the one active pen. If a downlink signal is not received by the touch sensing device 140 from any timing, that is, when one active pen is released from the touch sensing device 140, the touch sensing device 140 may search for the plurality of active pens again. That is, the touch sensing device 140 may repeat the above process by transmitting uplink signals to the plurality of active pens again.

Figure 5:
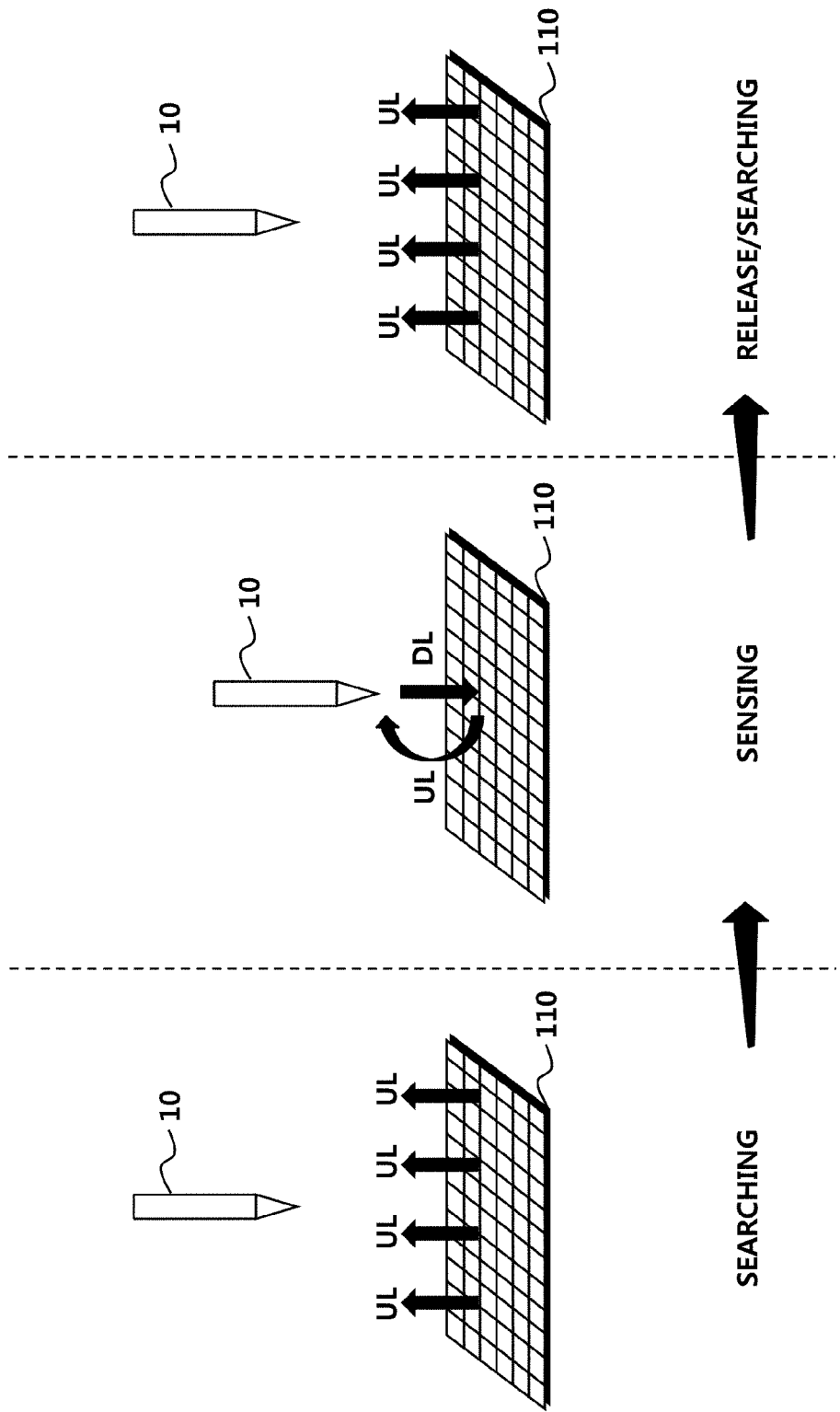
FIG. 5 is a diagram for describing the release of an active pen according to an embodiment.

FIG. 5 is a diagram for describing the release of an active pen 10 according to an embodiment.

Referring to FIG. 5, a process of the active pen 10 being released is illustrated.

In a searching step SEARCHING, the touch sensing device may transmit an uplink signal UL to the active pen 10 in order to recognize the presence of the active pen 10.

In a sensing step SENSING, when the active pen 10 receives the uplink signal UL and transmits a corresponding downlink signal DL to the touch sensing device 140, the touch sensing device 140 may receive data of the active pen 10 through the downlink signal DL.

In a release step RELEASE, communication for the downlink signal DL between the touch sensing device 140 and the active pen 10 may be stopped. The stop of the communication of the downlink signal DL may occur due to an external factor. If a distance between the active pen 10 and the panel 110 is increased because a user of the active pen 10 inputs another symbol after leaving a space while inputting a symbol, communication for the downlink signal DL may be cut off, and the active pen 10 may be released.

When the active pen 10 is released, the touch sensing device may transmit an uplink signal UL to the active pen 10 in order to recognize the presence of the active pen 10. The touch sensing device 140 enters the searching step again.

Figure 6:
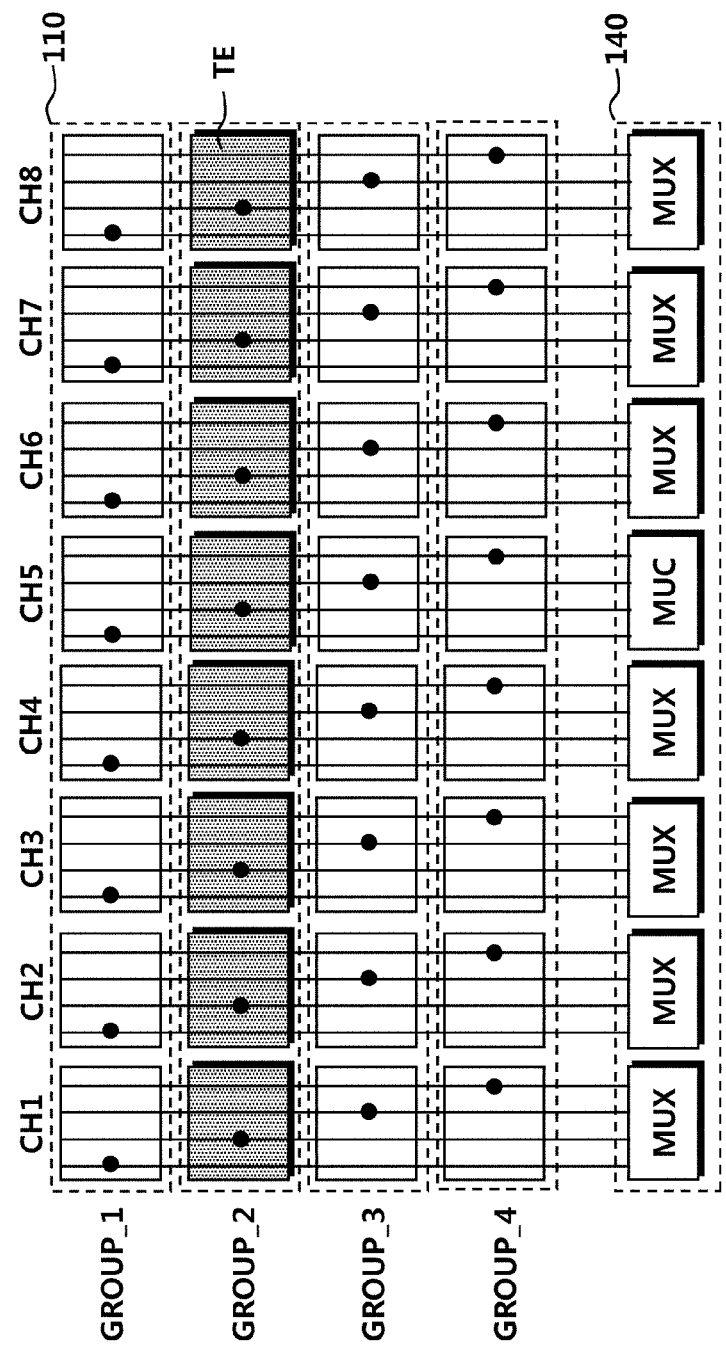
FIG. 6 is a diagram for describing a concept of sensing of the touch sensing device according to an embodiment.

FIG. 6 is a diagram for describing a concept of sensing of the touch sensing device 140 according to an embodiment.

Referring to FIG. 6, an example in which the touch sensing device 140 drives a plurality of touch electrodes TE of the panel 110 in order to sense a touch or approach of an object including an active pen 10 or a finger is illustrated. The touch sensing device 140 may drive the plurality of touch electrodes TE for each line.

The plurality of touch electrodes TE may be disposed in the panel 110. The plurality of touch electrodes TE may be grouped and driven according to a predetermined method.

The plurality of touch electrodes TE may be disposed in a matrix form. A plurality of touch electrodes TE disposed in one line may be grouped into one group and driven together. In this figure, four touch electrodes TE may be included in each channel. A total of eight channels CH1 to CH8 and a total of thirty-two touch electrodes TE may be disposed in the panel 110. When the touch electrodes TE are selected from each channel in a way to form one line, the plurality of selected touch electrodes TE may form one group. For example, a second group GROUP_2 may be a set of touch electrodes TE disposed in a second line of the eight channels CH1 to CH8 (i.e., shaded touch electrodes in FIG. 6).

The touch sensing device 140 may include a series of MUXs. The touch sensing device 140 may select a touch electrode TE from each channel through the series of MUXs (multiplexors), and may drive the selected touch electrode TE. The touch sensing device 140 may drive a plurality of touch electrodes TE, forming one line, for each group.

For example, the series of MUXs may select the second line of the eight channels CH1 to CH8, that is, a plurality of touch electrodes TE of the second group GROUP_2. The touch sensing device 140 may sense a touch or approach of an object in the second line.

Figure 7:
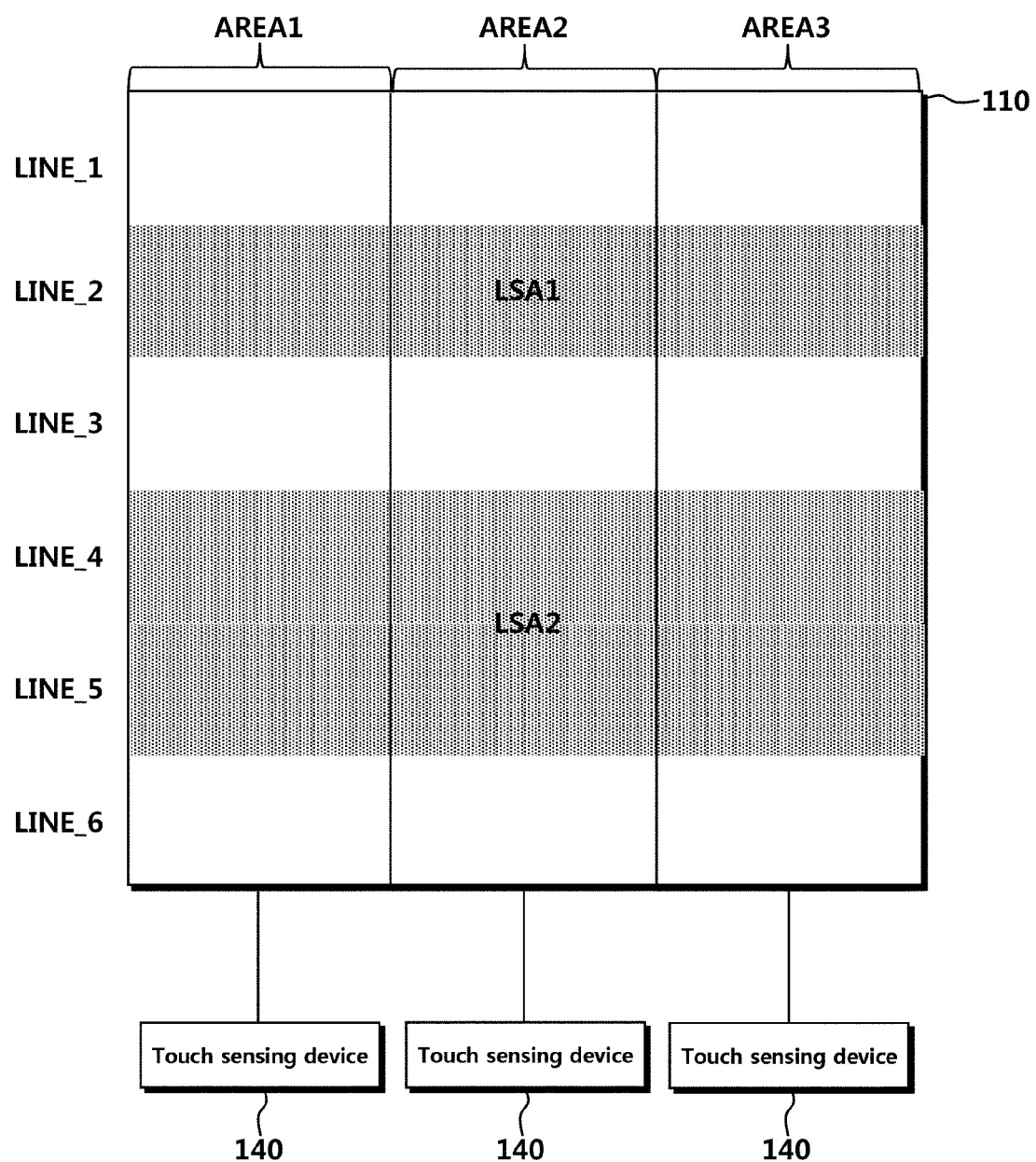
FIG. 7 is a diagram for describing local sensing of the touch sensing device according to an embodiment.

FIG. 7 is a diagram for describing local sensing of the touch sensing device according to an embodiment.

Referring to FIG. 7, the touch sensing device 140 may perform local sensing. The local sensing may mean that the touch sensing device 140 consistently drives a predetermined area of the panel 110 for a predetermined period. A predetermined area of the panel 110 consistently driven by the touch sensing device 140 may be named a local sensing area (LSA). In particular, when sensing an active pen 10, the touch sensing device 140 may consistently perform the transmission of an uplink signal and the reception of a downlink signal only in an LSA.

In the display apparatus, the touch electrodes of the panel 110 may be divided into areas and driven by the plurality of touch sensing devices 140. Each of the touch sensing devices 140 may select touch electrodes disposed in each area through MUXs, and may drive the selected touch electrodes.

For example, the panel 110 may be divided into first to third areas AREA1 to AREA3. Each of the touch sensing devices 140 may drive only touch electrodes included in each area. As illustrated in FIG. 7, each of the touch sensing devices 140 may drive touch electrodes for each line. In FIG. 7, a plurality of touch electrodes may form a total of six lines LINE1 to LINE6. Each of the touch sensing devices 140 may drive touch electrodes included in the second, fourth and fifth lines LINE2, LINE4, and LINE5.

Areas of the panel 110 independently driven by the plurality of touch sensing devices 140 may form an LSA. For example, touch electrodes driven in the second line LINE2 of the first to third areas AREA1 to AREA3 may form a first LSA LSA1. Touch electrodes driven in the fourth and fifth lines LINE4 and LINE5 of the first to third areas AREA1 to AREA3 may form a second LSA LSA2.

Furthermore, each of the plurality of touch sensing devices 140 may form LSAs in various forms by driving different lines in each area. That is, the LSA may vary in a way not to have a line form.

Figure 8:
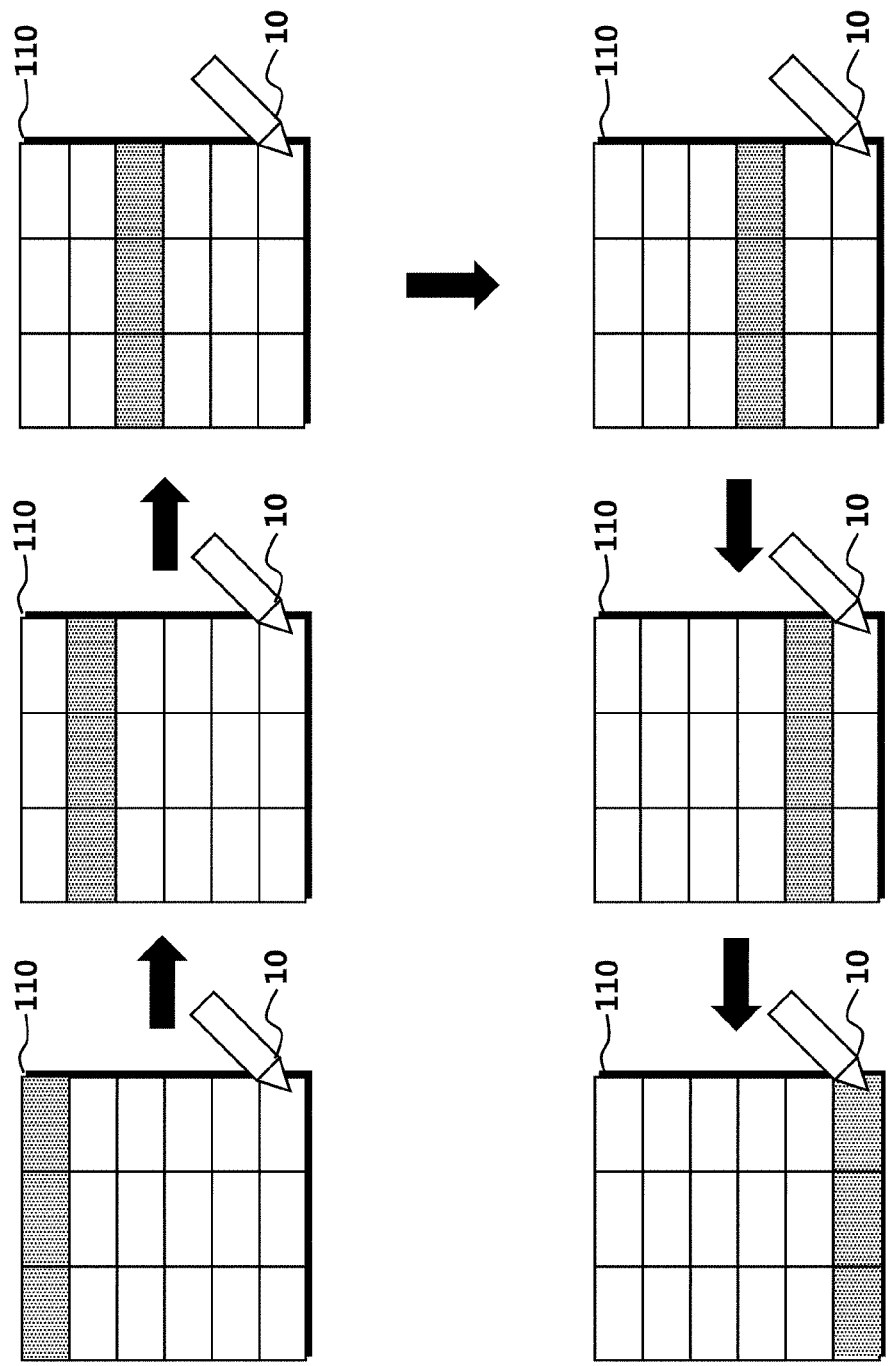
FIG. 8 is an exemplary diagram for describing sequential sensing of the touch sensing device.

FIG. 8 is an exemplary diagram for describing sequential sensing of the touch sensing device.

Referring to FIG. 8, the touch sensing device 140 may perform sequential sensing in accordance with local sensing. The sequential sensing may mean that the touch sensing device 140 drives touch electrodes in predetermined order regardless of a location of an object in the panel 110. In particular, in the case of sequential sensing for an active pen 10, the touch sensing device 140 may transmit an uplink signal in order to recognize the presence of the active pen 10 in an area of the panel 110 in which the active pen 10 is not present. Hereinafter, an example in which the touch sensing device 140 sequentially drives touch electrodes from a first line to the last line is described. An area sensed in the panel may be indicated as a shaded area.

For example, the touch sensing device 140 may receive data from the active pen 10 through a downlink signal. The active pen 10 may be located in the last line. A plurality of touch electrodes of the panel 110 may form a total of six lines. The touch sensing device 140 may sequentially drive touch electrodes from the first line to the sixth line. Although the active pen 10 is located in the last line, the touch sensing device 140 may sequentially drive the touch electrodes from the first line to the sixth line in predetermined order.

Figure 9:
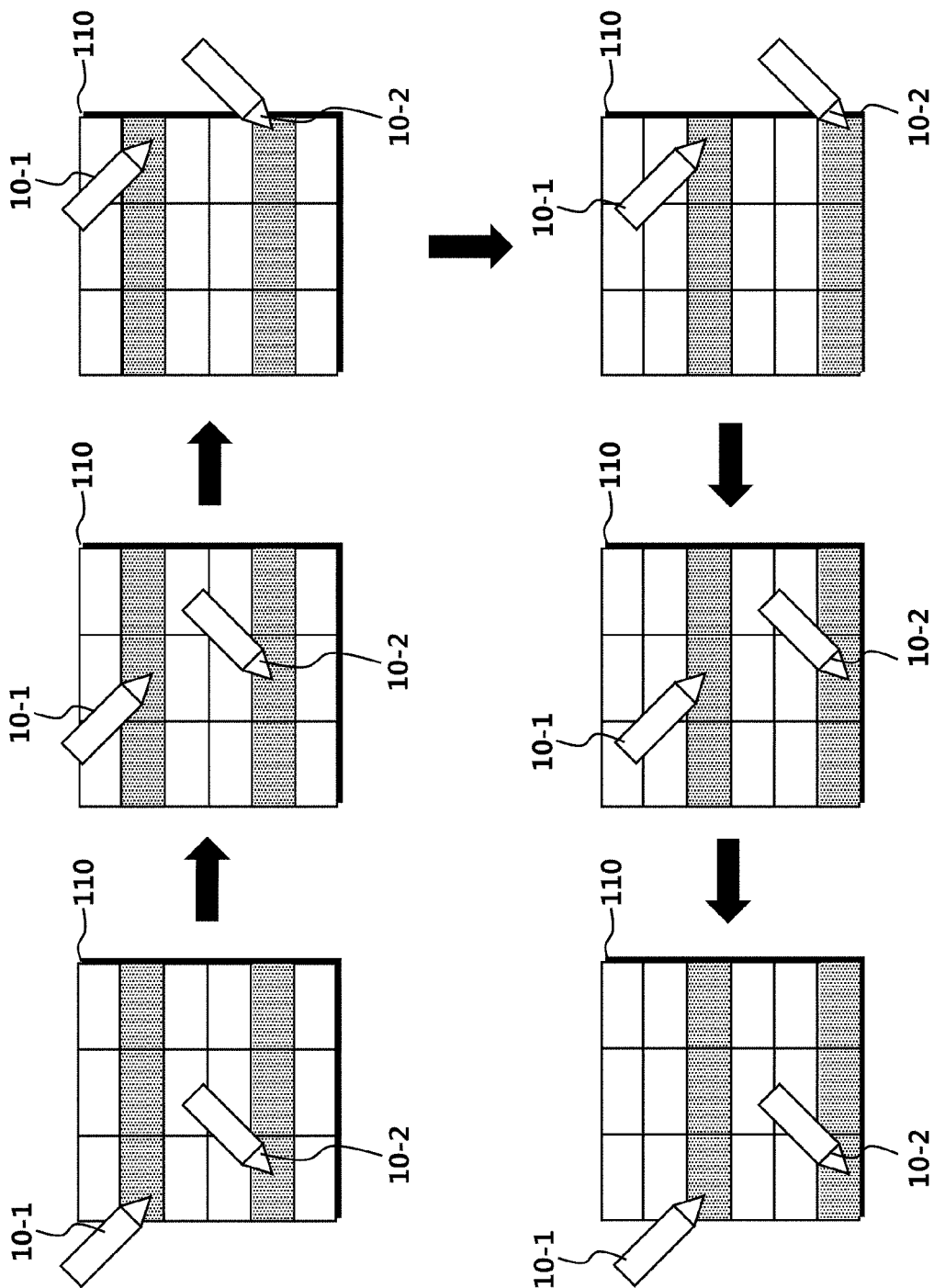
FIG. 9 is an exemplary diagram for describing local sensing of the touch sensing device according to an embodiment.

FIG. 9 is an exemplary diagram for describing local sensing of the touch sensing device according to an embodiment.

Referring to FIG. 9, the touch sensing device 140 may perform local sensing for two or more active pens. The local sensing may mean that the touch sensing device 140 drives a touch electrode at a location of an object in the panel 110 or touch electrodes near the location by considering the location of the object. In particular, in the case of local sensing for an active pen 10, the touch sensing device 140 may receive a downlink signal in an area of the panel 110 in which the active pen is present. Hereinafter, an example in which the touch sensing device 140 performs local sensing on two active pens is described. An area sensed in the panel 110 may be indicated as a shaded area.

For example, the touch sensing device 140 may receive a plurality of data from a first active pen 10-1 and a second active pen 10-2 through a plurality of downlink signals. The first active pen 10-1 may be located in a second line, and the second active pen 10-2 may be located in a fifth line. A plurality of touch electrodes of the panel 110 may form a total of six lines. The touch sensing device 140 may drive the touch electrodes on the basis of the locations of the first active pen 10-1 and the second active pen 10-2. In order to sense the first active pen 10-1, the touch sensing device 140 may consistently sense the second line. In order to sense the second active pen 10-2, the touch sensing device 140 may consistently sense the fifth line.

Even if an active pen moves in the panel 110, the touch sensing device 140 may track a location of the active pen, and may consistently drive a touch electrode at the location of the active pen or touch electrodes near the location.

For example, even if the first active pen 10-1 moves from the second line to the third line, the touch sensing device 140 may sense the first active pen 10-1 by driving the third line. Even if the second active pen 10-2 moves from the fifth line to the sixth line, the touch sensing device 140 may sense the second active pen 10-2 by driving the sixth line.

As described above, the touch sensing device 140 may drive touch electrodes on the basis of a first local sensing area including a location of the first active pen, and may simultaneously drive touch electrodes on the basis of a second local sensing area including a location of the second active pen.

In this case, the touch sensing device 140 may perform local sensing on each active pen 10 unless communication with each active pen is stopped. Such a case may include a case where a user does not release any one active pen 10 by inputting continuous paths to the touch panel. If a user releases any one active pen 10 by inputting a discontinuous path to the touch panel, the touch sensing device 140 may resume searching for the active pen. Such a search is also locally performed, and is described later.

Figure 10:
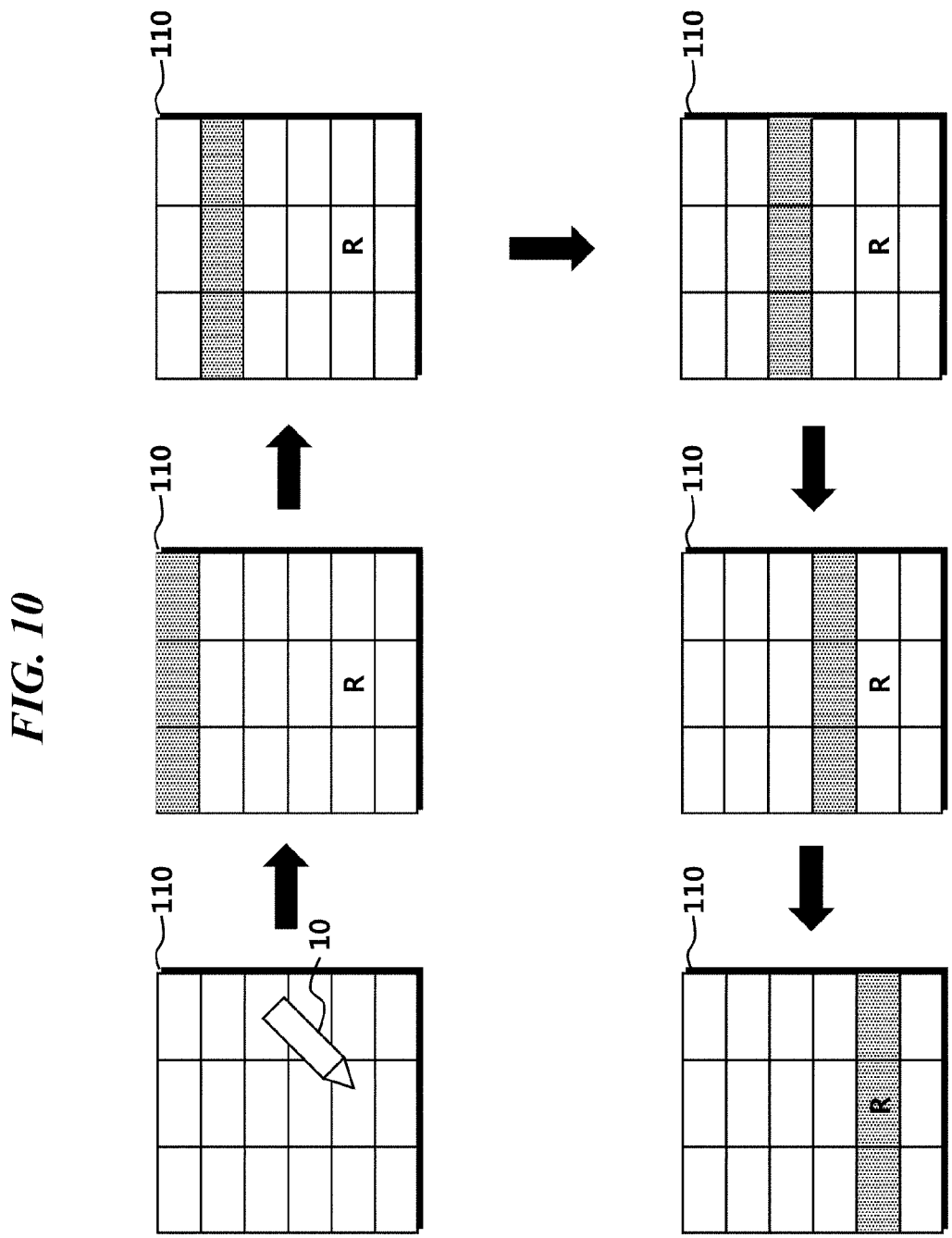
FIG. 10 is an exemplary diagram for describing a sequential search of the touch sensing device.

FIG. 10 is an exemplary diagram for describing a sequential search of the touch sensing device.

Referring to FIG. 10, the touch sensing device 140 may perform a sequential search in accordance with sequential sensing. Searching is for an active pen 10 among objects, and may mean that the touch sensing device 140 consistently transmits an uplink signal to an active pen 10 or waits for the reception of a downlink signal from an active pen 10. Furthermore, searching is a process of recognizing the presence of an active pen 10 before the active pen 10 is sensed, and may also be applied to a case where an active pen 10 is separated from the panel 110, that is, the active pen 10 is released, during sensing. Therefore, if an active pen 10 transmits a downlink signal to the touch sensing device 140 and the touch sensing device 140 restarts to receive the downlink signal during a search, the touch sensing device 140 may resume the sensing of the active pen 10. When recognizing the presence of the active pen 10, the touch sensing device 140 may also obtain a location of the active pen 10.

A sequential search may mean that the touch sensing device 140 transmits uplink signals through touch electrodes in predetermined order regardless of a location of an active pen 10 in the panel 110. That is, the touch sensing device 140 may recognize the presence of the active pen 10 through the transmission of the uplink signals. The touch sensing device 140 may transmit an uplink signal in order to recognize the presence of an active pen 10 even in an area of the panel 110 in which the active pen 10 is not present. Hereinafter, an example in which any one active pen is released and the touch sensing device 140 sequentially transmits uplink signals from a first line to the last line is described. An area searched in the panel 110 may be indicated as a shaded area.

For example, a plurality of touch electrodes of the panel 110 may form a total of six lines. While the touch sensing device senses the active pen 10 in the fifth line, the active pen 10 may be released. In FIG. 10, a point at which the active pen 10 is released may be indicated as R. Even though the active pen 10 has been released in the fifth line, the touch sensing device 140 may perform a search from the first line. The touch sensing device 140 may sequentially transmit uplink signals from the first line to the sixth line.

Figure 11:
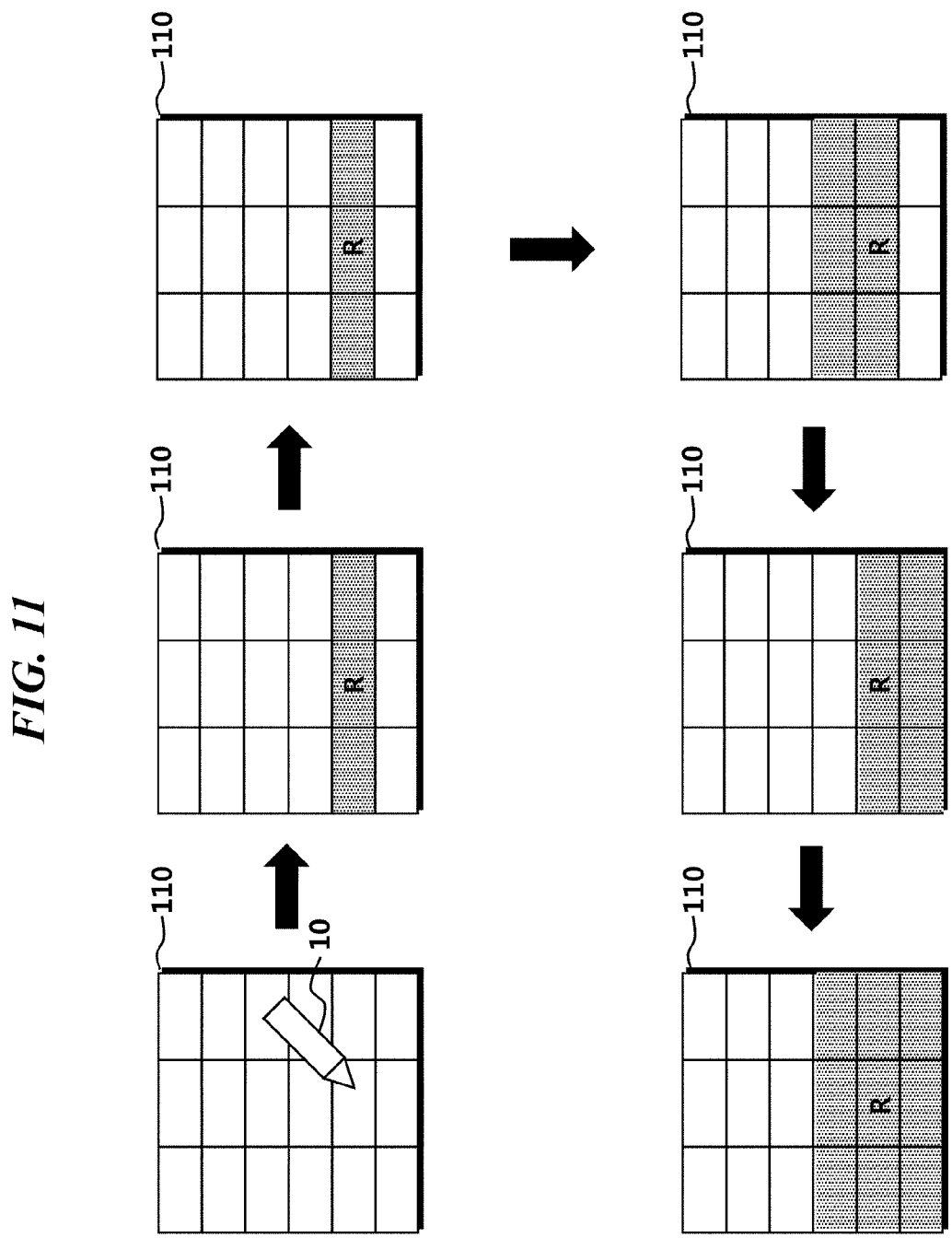
FIG. 11 is an exemplary diagram for describing a local search of the touch sensing device according to an embodiment.

FIG. 11 is an exemplary diagram for describing a local search of the touch sensing device 140 according to an embodiment.

Referring to FIG. 11, the touch sensing device 140 may perform a local search in accordance with the sequential search. The local search may mean that the touch sensing device 140 transmits an uplink signal through a touch electrode at a location of an active pen 10 or touch electrodes near the location by considering the location of the active pen in the panel 110. In this case, the location of the active pen 10 may be a point at which the active pen 10 is finally sensed when the active pen is released.

The touch sensing device 140 may sense a touch or approach of the active pen 10 in one touch area. When the sensing of the active pen 10 in the one touch area is stopped, the touch sensing device 140 may perform a search to check the presence of the active pen 10 in the one touch area or in the vicinity thereof.

For example, a plurality of touch electrodes of the panel 110 may form a total of six lines. While the touch sensing device 140 senses the active pen 10 in the fifth line, the active pen 10 may be released. In FIG. 11, a point at which the active pen 10 is released may be indicated as R. When the active pen 10 is released in the fifth line, the touch sensing device 140 may search the fifth line including the point at which the active pen 10 is released.

Such a local search may also be identically applied to a case where one active pen is released while a plurality of active pens is sensed. While the touch sensing device 140 senses a touch or approach of a first active pen in a first touch area and senses a touch or approach of a second active pen in a second touch area, when the sensing of the first active pen in the first touch area is stopped, the touch sensing device 140 may perform a search to check the presence of the first active pen in the first touch area or in the vicinity thereof.

In this case, when the sensing of the second active pen in the second touch area is also stopped, the touch sensing device may perform both a search for the first active pen in the first touch area and a search for the second active pen in the second touch area.

Furthermore, the touch sensing device 140 may variably adjust a searching area. For example, the touch sensing device 140 may also search a line near a line including a location where the active pen 10 is released. The touch sensing device 140 may drive the fourth and fifth lines, may drive the fifth and sixth lines or may drove the fourth to sixth lines.

Figure 12:
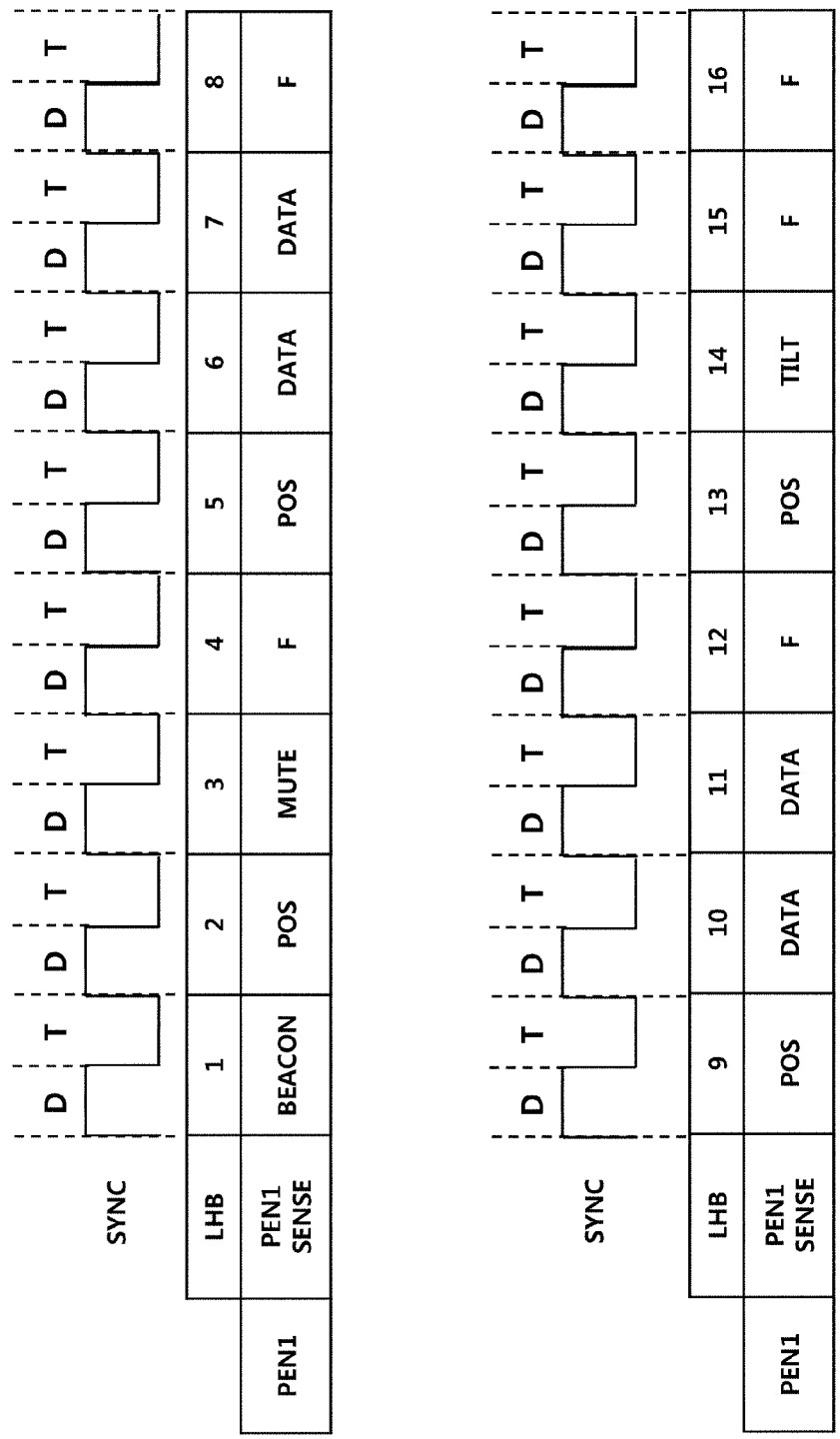
FIG. 12 is an exemplary diagram for describing data received from only one active pen for each touch interval if the active pen is searched for and sensed according to an embodiment.
Figure 13:
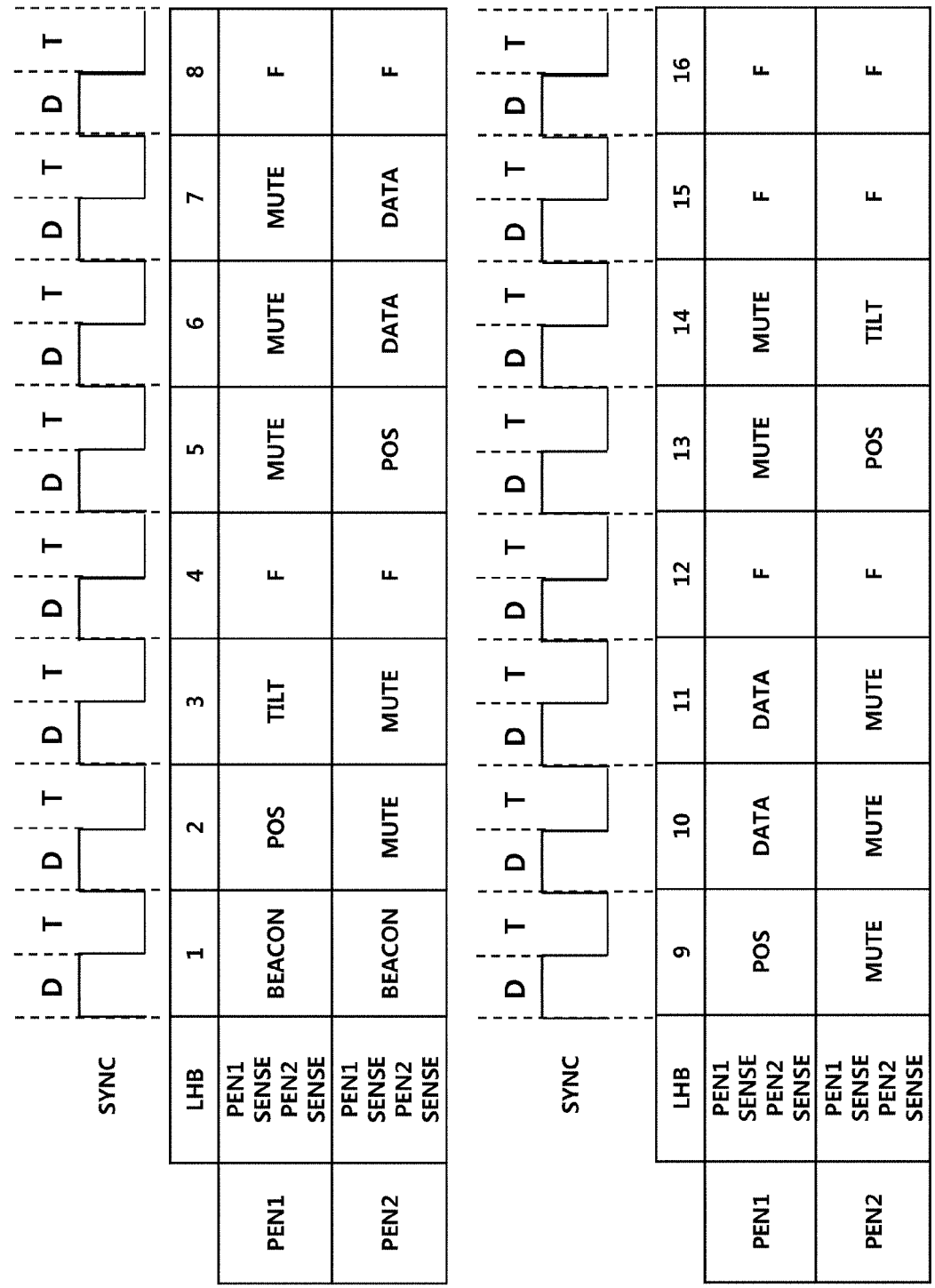
FIG. 13 is an exemplary diagram for describing data received from a plurality of active pens for each touch interval if the active pens are searched for and sensed according to an embodiment.

FIG. 12 is an exemplary diagram for describing data received from only one active pen for each touch interval if the active pen 10 is searched for and sensed according to an embodiment. FIG. 13 is an exemplary diagram for describing data received from a plurality of active pens for each touch interval if the active pens is searched for and sensed according to an embodiment.

The touch sensing device 140 may receive a downlink signal from an active pen 10 in a plurality of touch intervals in every frame, and may receive data for the active pen from the downlink signal.

The sensing circuit 220 of the touch sensing device 140 may receive a synchronization signal SYNC, and may recognize a plurality of touch intervals through the synchronization signal SYNC. In the touch interval, the active pen 10 may transmit the downlink signal to a touch electrode. The touch sensing device 140 may receive the downlink signal from the touch electrode.

The synchronization signal SYNC may determine together a touch interval and a display interval in which image data is output. The synchronization signal SYNC may include a time division signal or a touch synchronization signal to define a touch interval. In this figure, the display interval may be indicated as D, and the touch interval may be indicated as T.

The touch interval may mean a period of one frame between the time when image data is output from some lines and the time when image data is output from next some lines. A touch interval generated using such a method may be named a long horizontal blank (LHB).

The LHB may be assigned in common and used for the touch sensing device to search for or sense an active pen. Searching and sensing described hereinafter may be concepts including both a local search and a local sensing. For example, if one LHB is assigned to and used to search for one of a plurality of active pens, the one LHB may be used for the sensing of the one active pen without any change. The touch sensing device 140 may search for the one active pen by transmitting an uplink signal in the one LHB and waiting for the reception of a downlink signal, and may receive the downlink signal from the one active pen in the one LHB in the same way.

The touch sensing device 140 may sense an active pen and a finger together.

Therefore, data of the active pen 10 may be received and capacitance change data F by the finger may also be received in an LHB. The data of the active pen 10 may include a beacon to initiate communication, position POS of the active pen 10, tilt TILT of the active pen 10, state information DATA of the active pen 10, etc.

FIG. 12 illustrates data received from only one active pen for each touch interval if the active pen is searched for and sensed.

For example, if the touch sensing device senses only a first active pen PEN1 (PEN1 SENSE), the first active pen PEN1 may transmit, to the touch sensing device, a beacon BEACON, position POS of the active pen, tilt TILT of the active pen or state information DATA of the active pen through a downlink signal in sixteen LHBs. Furthermore, the first active pen PEN1 may not operate in some touch intervals, and may not exchange signals with the touch sensing device (MUTE).

Even in the step in which one active pen is searched for, an LHB of one frame may be exclusively used for only the one active pen. In this case, the touch sensing device transmits an uplink signal in the LHB of the one frame, and waits for the reception of a downlink signal from the one active pen.

FIG. 13 illustrates data received from all of a plurality of active pens for each touch interval if the active pens are searched for and sensed.

For example, if the touch sensing device 140 senses a first active pen PEN1 (PEN1 SENSE) and simultaneously senses a second active pen PEN2 (PEN2 SENSE), each of the first active pen PEN1 and the second active pen PEN2 may transmit, to the touch sensing device 140, a beacon BEACON, position POS of the active pen 10, tilt TILT of the active pen 10 or state information DATA of the active pen 10 through a downlink signal in sixteen LHBs. Furthermore, the first active pen PEN1 or the second active pen PEN2 may not operate in some touch intervals, and may not exchange signals with the touch sensing device (MUTE). The mute state of the first active pen PEN1 or the second active pen PEN2 may be alternated for each touch interval of one frame, which will be described later.

Furthermore, the touch sensing device 140 may diversify a searching method so that a plurality of active pens is not searched for in the same touch interval. The touch sensing device 140 may diversify a sensing method so that a plurality of active pens is not sensed in the same touch interval. That is, only one active pen may be searched for or sensed in one touch interval. For example, the touch sensing device 140 may alternately search for or sense the first active pen PEN1 and the second active pen PEN2 in every frame. Alternatively, the touch sensing device 140 may search for or sense the first active pen PEN1 in one frame, and may search for or sense the second active pen PEN2 in another frame. In this case, the second active pen PEN2 may be in a mute state in the one frame, and the first active pen PEN1 may be in a mute state in the other frame.

Even in the step in which a plurality of active pens is searched for, an LHB of one frame may be exclusively used for only an active pen to which the LHB has been assigned among the plurality of active pens. That is, only a specific active pen may use a specific LHB in a searching step. In this case, the touch sensing device 140 transmits different uplink signals for each LHB of one frame, and waits for the reception of different downlink signals from the plurality of active pens.

Although one active pen is released and the released one active pen is searched for or sensed again, the touch sensing device may exchange signals with the one active pen in the same LHB as before the one active pen is released.

For example, while the first active pen PEN1 is released and sensed again, as illustrated in FIG. 12, the touch sensing device 140 may assign a touch interval (e.g., LHB) to the first active pen PEN1. A method of the touch sensing device 140 receiving a downlink signal from the first active pen PEN1 in order to sense the first active pen PEN1 after and before the first active pen PEN1 is released may the same.

Furthermore, although one of a plurality of active pens is released and the released at least one active pen is searched for or sensed again, the touch sensing device 140 may exchange signals with the plurality of active pens in the same LHBs as before the plurality of active pens is released.

For example, while the first active pen PEN1 and the second active pen PEN2 are released and sensed again, as illustrated in FIG. 13, the touch sensing device 140 may assign a touch interval (e.g., LHB) to the first active pen PEN1 and the second active pen PEN2. A method of the touch sensing device 140 receiving different downlink signals from the first active pen PEN1 and the second active pen PEN2 in order to sense the first active pen PEN1 and the second active pen PEN2 before and after the first active pen PEN1 and the second active pen PEN2 are released may be the same.

In this case, the touch sensing device 140 may uniformly assign LHBs to the first active pen PEN1 and the second active pen PEN2. The touch sensing device 140 receives both the downlink signal of the first active pen PEN1 and the downlink signal of the second active pen PEN2, but may alternately receive the downlink signals.

For example, the touch sensing device 140 may use fifth to seventh LHBs to search for and sense the second active pen PEN2. In contrast, the touch sensing device 140 may use ninth to eleventh LHBs to search for and sense the first active pen PEN1. In the fifth to seventh LHBs, when the second active pen PEN2 transmits the position POS of the active pen and state information DATA of the active pen to the touch sensing device, the first active pen PEN1 may be in a mute state in which the first active pen PEN1 does not transmit any signal, and may not perform any operation along with the touch sensing device. In contrast, in the ninth to eleventh LHBs, when the first active pen PEN1 transmits the position POS of the active pen and state information DATA of the active pen to the touch sensing device, the second active pen PEN2 may be in a mute state in which the second active pen PEN2 does not transmit any signal, and may not perform any operation along with the touch sensing device.

Alternatively, the touch sensing device may exclusively assign an LHB of each frame to only any one of a plurality of active pens. For example, the touch sensing device may exclusively assign an LHB of each frame to only any one of the first active pen PEN1 and the second active pen PEN2. The touch sensing device 140 may transmit an uplink signal to the first active pen PEN1 in one frame, and may transmit an uplink signal to the second active pen PEN2 in another frame. The touch sensing device 140 may receive only a downlink signal from the first active pen PEN1 in one frame, and may receive only a downlink signal from the second active pen PEN2 in another frame.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A touch sensing device for sensing at least one active pen using touch electrodes, comprising:
a driving circuit configured to transmit an uplink signal; and
a sensing circuit configured to receive a downlink signal corresponding to the uplink signal,
wherein, the sensing circuit receives a first downlink signal from a first active pen through a first touch electrode in order to sense a touch or an approach of the first active pen, and
wherein, if reception of the first downlink signal from the first active pen through the first touch electrode is stopped and the first downlink signal is not received for a predetermined time, the sensing circuit starts to search for the first active pen within an area corresponding to the first touch electrode or touch electrodes near the first touch electrode from among an entire area of a panel, in order to recognize the first active pen.

2. The touch sensing device of claim 1, wherein, when the reception of the first downlink signal through the first touch electrode is stopped, the driving circuit transmits a first uplink signal in order to search for the first active pen through the first touch electrode or the touch electrodes near the first touch electrode.

3. The touch sensing device of claim 1, wherein the sensing circuit restarts to receive the first downlink signal through the first touch electrode or the touch electrodes near the first touch electrode and resumes sensing a touch or approach of the first active pen.

4. The touch sensing device of claim 1, wherein the sensing circuit receives a synchronization signal which defines display intervals and touch intervals and receives the first downlink signal in order to sense the first active pen in some of the touch intervals.

5. The touch sensing device of claim 1, wherein the driving circuit transmits a second uplink signal to a second active pen and the sensing circuit receives a second downlink signal, corresponding to the second uplink signal, from the second active pen through a second touch electrode and starts to search for the second active pen by waiting for the reception of the second downlink signal through the second touch electrode or touch electrodes near the second touch electrode when the reception of the second downlink signal through the second touch electrode is stopped.

6. The touch sensing device of claim 5, wherein the sensing circuit senses both the first active pen and the second active pen in every frame.

7. The touch sensing device of claim 6, wherein the sensing circuit receives a synchronization signal which defines display intervals and touch intervals and senses the first active pen in some of the touch intervals of one frame and senses the second active pen in others of the touch intervals thereof.

8. The touch sensing device of claim 1, wherein the driving circuit transmits a touch driving signal to the touch electrodes and the sensing circuit senses a touch or approach of an object for the panel in response to a response signal of the touch electrodes for the touch driving signal.

9. A touch sensing system for sensing a plurality of active pens, comprising:
a panel including a first touch area and a second touch area; and
a touch sensing device configured to sense a touch or approach of a first active pen by receiving a first downlink signal from the first active pen in the first touch area and to sense a touch or approach of a second active pen receiving a second downlink signal from the second active pen in the second touch area,
wherein, if the sensing of the first active pen in the first touch area is stopped and the first active pen is not sensed for a predetermined time, the touch sensing device performs a search to recognize the first active pen within the first touch area or within a vicinity of the first touch area from among an entire area of the panel.

10. The touch sensing system of claim 9, wherein, when the sensing of the second active pen in the second touch area is stopped, the touch sensing device performs both the search for the first active pen in the first touch area and the search for the second active pen in the second touch area.

11. The touch sensing system of claim 10, wherein the touch sensing device receives a synchronization signal which defines display intervals and touch intervals, searches for the first active pen in some of the touch intervals of one frame, and searches for the second active pen in others of the touch intervals thereof.

12. The touch sensing system of claim 11, wherein, when the sensing of the first active pen and the second active pen is resumed, the touch sensing device senses the first active pen in the some of the touch intervals, and senses the second active pen in the others of the touch intervals.

13. The touch sensing system of claim 9, wherein the touch sensing device identifies a location of the first active pen through the search.

14. The touch sensing system of claim 9, wherein the touch sensing device transmits touch driving signals to the first touch area and the second touch area and senses a touch or approach of an object for the panel in response to response signals for the touch driving signals.

* * * * *